United States Patent
Sikora et al.

(10) Patent No.: US 9,159,139 B2
(45) Date of Patent: Oct. 13, 2015

(54) METHOD AND DEVICE FOR PROCESSING PIXELS CONTAINED IN A VIDEO SEQUENCE

(75) Inventors: Thomas Sikora, Berlin (DE); Andreas Krutz, Berlin (DE); Alexander Glantz, Berlin (DE)

(73) Assignee: TECHNISCHE UNIVERSITAT BERLIN, Berlin (DE)

( * ) Notice: Subject to any disclaimer, the term of this patent is extended or adjusted under 35 U.S.C. 154(b) by 937 days.

(21) Appl. No.: 13/182,900

(22) Filed: Jul. 14, 2011

(65) Prior Publication Data
US 2013/0016784 A1    Jan. 17, 2013

(51) Int. Cl.
*G06T 7/20*    (2006.01)

(52) U.S. Cl.
CPC ......... *G06T 7/20* (2013.01); *G06T 2207/10016* (2013.01); *G06T 2207/20182* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,278,735 B1 * | 8/2001 | Mohsenian | 375/240 |
| 7,852,936 B2 * | 12/2010 | Mukerjee et al. | 375/240.15 |
| 8,009,732 B2 * | 8/2011 | Bhaskaran | 375/240.12 |
| 2003/0053545 A1 | 3/2003 | Lainema et al. | |
| 2009/0109341 A1 * | 4/2009 | Oguz et al. | 348/625 |
| 2009/0154816 A1 * | 6/2009 | Swazey et al. | 382/232 |
| 2010/0002770 A1 * | 1/2010 | Motta et al. | 375/240.16 |
| 2010/0296579 A1 * | 11/2010 | Panchal et al. | 375/240.15 |
| 2010/0321583 A1 * | 12/2010 | Shields et al. | 348/699 |
| 2011/0064375 A1 * | 3/2011 | Raghoebardajal et al. | 386/224 |

FOREIGN PATENT DOCUMENTS

WO    WO 2011/050997 A1    5/2011

OTHER PUBLICATIONS

Werf et al., "I.McMIC: A Single-Chip MPEG-2 Video Encoder for Storage," IEEE Journal of Solid-State Circuits, vol. 32, No. 1, Nov. 1997, pp. 1817-1823.*
A. Glantz et al., "Video Coding Using Global Motion Temporal Filtering," in ICIP, 2009, pp. 1053-1056.
P. List et al., "Adaptive Deblocking Filter," IEEE Transactions on Circuits and Systems for Video Technology (TCSVT), 13(7): 2003, pp. 614-619.

(Continued)

*Primary Examiner* — Jay Patel
*Assistant Examiner* — Reza Aghevli
(74) *Attorney, Agent, or Firm* — Foley & Lardner LLP (57) ABSTRACT

Processing the pixel value of at least one image pixel contained in a current frame of a video sequence includes constructing an individual motion trajectory including motion-shifted versions of the at least one image pixel over a plurality of preceding and/or subsequent frames, and processing the pixel value based on the individual motion trajectory. Constructing the individual motion trajectory includes choosing the at least one image pixel of the current frame as a start pixel of the individual motion trajectory, and adding motion-shifted versions of the at least one image pixel of preceding and/or subsequent frames to the individual motion trajectory. For each of the plurality of preceding and/or subsequent frames, at least two motion-shifted versions of the at least one image pixel are determined, and one of the at least two motion-shifted versions of the at least one image pixel is selected and added to the individual motion trajectory.

16 Claims, 5 Drawing Sheets

(56) References Cited

OTHER PUBLICATIONS

E. Dubois et al., "Noise Reduction in Image Sequences Using Motion-Compensated Temporal Filtering," IEEE Transactions on Communications, 32(7), Jul. 1984, pp. 826-831.

Ohm, Jens-Rainer, "Three-Dimensional Subband Coding with Motion Compensation," IEEE Transactions on Image Processing, 3(5), Sep. 1994, pp. 559-571.

X. Wang et al., "Simplified Update Step of Motion Compensated Temporal Filtering for Video Coding," in Proceedings of the 24th Picture Coding Symposium, 2006, pp. 826-831.

D.T. Vo et al., "Optimal Motion Compensated Spatio-Temporal Filter for Quality Enhancement of H.264/AVC Compressed Video Sequences," in Proceedings of the 16th International Conference on Image Processing (ICIP), 2009, pp. 3173-3176.

International Search Report.PCT/EP2012/063110 dated Nov. 2, 2012.

Mehmet K. Ozkan et al., "Adaptive Motion-Compensated Filtering of Noisy Image Sequences", 8378 IEEE Transactions on Circuits and Systems for Video Technology, Aug. 3, 1993, No. 4, pp. 277-290.

Aljoscha Smolic et al., "Long-Term Global Motion Estimation and Its Application for Sprite Coding, Content Description, and Segmentation", IEEE Transactions on Circuits and Systems for Video Technology, vol. 9, No. 8, Dec. 1999, pp. 1227-1242.

\* cited by examiner

METHOD AND DEVICE FOR PROCESSING PIXELS CONTAINED IN A VIDEO SEQUENCE

The present invention relates to methods and devices for processing pixels contained in a video sequence.

BACKGROUND OF THE INVENTION

An in-loop filter for processing video sequences is described in [1]. This filter provides adaptive de-blocking and has shown to improve both the subjective and the objective quality of a decoded video sequence.

The concept of motion compensated temporal filtering was first introduced in [2]. The notion of a motion trajectory and its applications to video coding were first described in [3], which was extended to a temporal filtering approach in [4]. Approaches with a similar aim have been presented in [5] and [6].

Even though most of the mentioned prior art filters provide quite good results, better performance is still desirable for many of today's video applications.

OBJECTIVE OF THE PRESENT INVENTION

An objective of the present invention is to provide a method for efficiently processing image pixels in order to increase the quality of a video sequence.

A further objective of the present invention is to provide a device for efficiently processing image pixels in order to increase the quality of a video sequence.

BRIEF SUMMARY OF THE INVENTION

An embodiment of the present invention relates to a method for processing the pixel value of at least one image pixel contained in a current frame of a video sequence, said method comprising the steps of constructing an individual motion trajectory comprising motion-shifted versions of the at least one image pixel over a plurality of preceding and/or subsequent frames, and processing the pixel value based on the individual motion trajectory,
wherein said step of constructing said individual motion trajectory comprises the steps of:
choosing the at least one image pixel of the current frame as a start pixel of the individual motion trajectory, and adding motion-shifted versions of the at least one image pixel of preceding and/or subsequent frames to the individual motion trajectory;
wherein for each of the plurality of preceding and/or subsequent frames, at least two motion-shifted versions of the at least one image pixel are determined,
wherein, for each of the plurality of preceding and/or subsequent frames, one of said at least two motion-shifted versions of the at least one image pixel is selected and wherein the selected motion-shifted version is added to the individual motion trajectory.

According to this embodiment of the invention, two or more motion-shifted versions of the image pixel are determined for each preceding and/or subsequent frame of the trajectory. This allows picking the "best" motion-shifted version out of a plurality of versions for each frame. Thus, the estimation of the pixel motion can be optimized for each frame in view of predefined criteria such as the most accurate motion estimation (i.e. best video quality) and/or a minimum number of additional bits for describing the pixel motion (i.e. maximum data compression).

The step of selecting one of said at least two motion-shifted versions of the at least one image pixel preferably includes comparing said at least two motion-shifted versions with each other or with the at least one image pixel of the current frame, and choosing one of said at least two motion-shifted versions based on the comparison result.

The step of comparing said at least two motion-shifted versions with each other preferably includes determining the distance between said at least two motion-shifted versions and choosing one of said at least two motion-shifted versions based on said distance or distances.

A first motion-shifted version and a second motion-shifted version of the at least one image pixel may be determined, wherein for each of the plurality of preceding and/or subsequent frames, the first motion-shifted version is added to the individual motion trajectory if the distance between the pixel location of the first motion-shifted version and the pixel location of the second motion-shifted version is smaller than a predefined threshold, and wherein for each of the plurality of preceding and/or subsequent frames, the second motion-shifted version is added to the individual motion trajectory if the distance between the pixel location of the first motion-shifted version and the pixel location of the second motion-shifted version exceeds said predefined threshold.

The first motion-shifted version of the at least one image pixel may be determined based on a first motion model, and the second motion-shifted version of the at least one image pixel may be determined based on a second motion model.

The second motion model preferably requires more motion related parameters and provides a more accurate estimation of pixel motion than the first motion model.

Further, for each of the plurality of preceding and/or subsequent frames, the first motion-shifted version may be added to the individual motion trajectory if the difference between the pixel value of the first motion-shifted version and the pixel value of the second motion-shifted version is smaller than a predefined threshold; and for each of the plurality preceding and/or subsequent frames, the second motion-shifted version is added to the individual motion trajectory if the difference between the pixel value of the first motion-shifted version and the pixel value of the second motion-shifted version exceeds said predefined threshold.

Furthermore the step of comparing said at least two motion-shifted versions with the at least one image pixel of the current frame may include determining the distances between said at least two motion-shifted versions and the at least one image pixel of the current frame, respectively, wherein for each of the plurality of preceding and/or subsequent frames, the first motion-shifted version is added to the individual motion trajectory if the difference in the distances is smaller than a predefined threshold, and wherein for each of the plurality of preceding and/or subsequent frames, the second motion-shifted version is added to the individual motion trajectory if the difference in the distances exceeds the predefined threshold.

The step of comparing said at least two motion-shifted versions with the at least one image pixel of the current frame may also include comparing the pixel values of said at least two motion-shifted versions with the pixel value of the at least one image pixel of the current frame, respectively, and choosing the motion-shifted version which has the most similar pixel value compared to the at least one image pixel of the current frame.

Further, an individual stop marker for the processed pixel value may be added to the video data bit stream, said individual stop marker describing the individual length of the individual motion trajectory that was used for forming said processed pixel value.

The individual motion trajectory of said image pixel may be constructed by concatenating at least two block motion vectors between adjacent frames of the video sequence, said at least two block motion vectors describing the motion of image blocks, each of which comprises said image pixel.

Furthermore, at least two block motion vectors between adjacent frames of the video sequence may be coded in the video bit stream.

The frames of said video sequence may be filtered and/or predicted by incorporating said processed pixel value of said image pixel into the video sequence.

At least one flag bit may be generated to signal the presence of the processed pixel values in the video sequence.

Furthermore, further video sequences having spatially adjacent frames with the same image pixel may be taken into account to form said processed pixel value of said image pixel.

The processed pixel value of said block image pixel is preferably formed by recursive accumulation of the pixel values of the selected motion-shifted versions of said image pixel along the individual motion trajectory.

The method may comprise at least two different process modes, wherein, in each process mode, an individual maximum number of frames is considered for constructing the individual motion trajectory of the at least one image pixel, and wherein a flag is generated which indicates the process mode that has been carried out.

A further embodiment of the present invention relates to a device capable of carrying out the method as described above.

The device may comprise a processor and a memory storing an executable computer program capable of performing the method's steps as described above.

The device may be a part of a filter (e.g. in-loop-filter), a decoder and/or an encoder.

A preferred embodiment of such a device comprises:
  trajectory constructing means configured to construct an individual motion trajectory comprising motion-shifted versions of said block image pixel over a multiplicity of neighboring frames; and
  combining means configured to combine the pixel values of the motion-shifted versions of said block image pixel along the individual motion trajectory using a weighting function, to form a processed pixel value of said block image pixel.

The trajectory constructing means and the combining means may be software modules stored in a memory and being run by a processor.

A preferred embodiment comprises a marker adder capable of adding at least one stop marker for at least one of the processed image pixels, said individual stop marker describing the individual length of the individual motion trajectory of said processed image pixel and/or a flag bit generator adapted to generate at least one flag bit to signal the presence of the processed pixel values in the video sequence.

The device may be an encoder for processing an incoming video sequence and generating an encoded video data bit stream, wherein the encoder comprises a data bit generator capable of generating said encoded video data bit stream that describes said video sequence, and wherein the encoder is configured to include said processed pixel values generated by said combining means into the encoded video data bit stream.

Alternatively, the device may be a decoder for decoding an encoded video data bit stream to generate a decoded video sequence, wherein the decoder comprises means for decoding data bits that describe said video sequence, and wherein the decoder is configured to include said processed pixel values generated by said combining means into the decoded video sequence.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
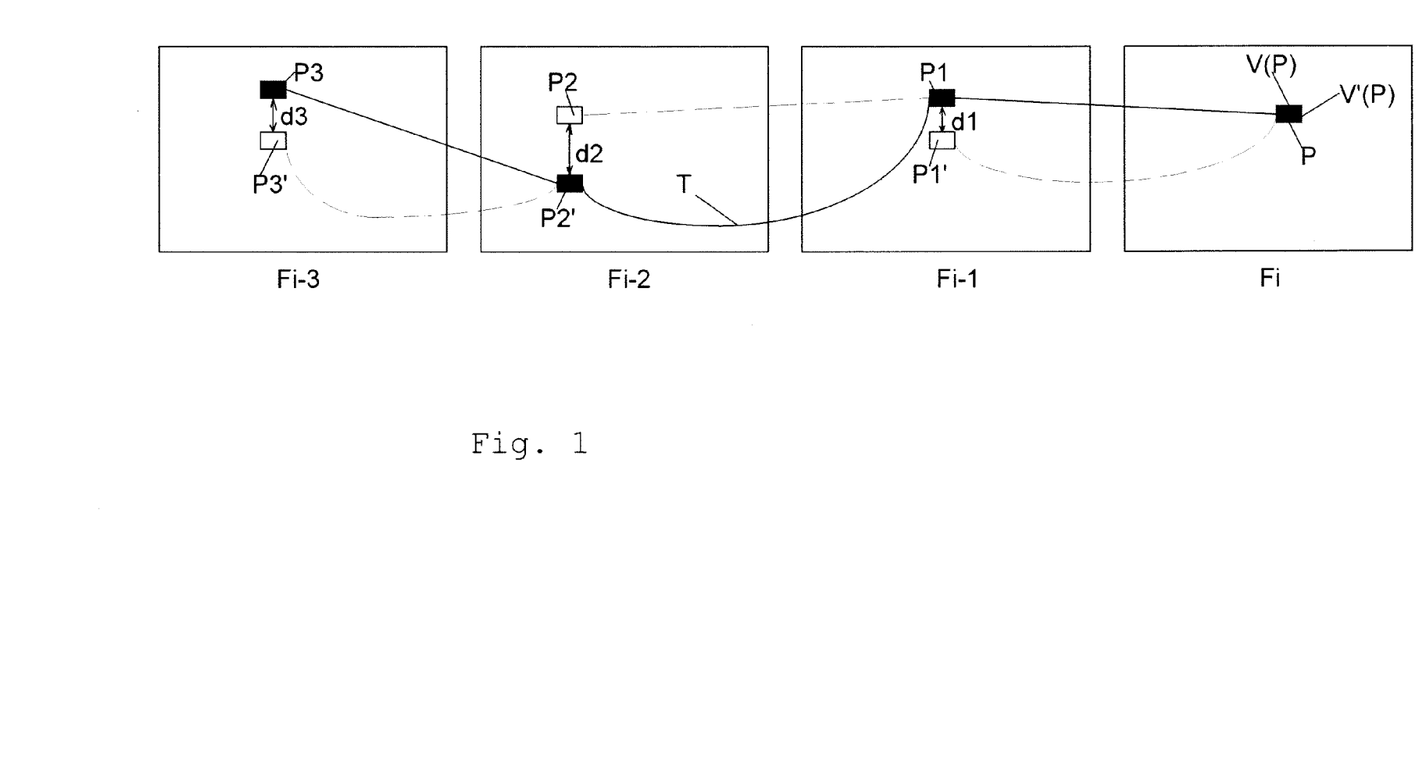
FIGS. 1-4 show exemplary embodiments of a method for processing the pixel value of image pixels in frames of a video sequence.

FIG. 1 shows a first exemplary embodiment of a method for processing a pixel value V(P) of an image pixel P contained in a current frame Fi of a video sequence.

First, an individual motion trajectory T is constructed for the image pixel P. The trajectory T extends from the current frame Fi to several preceding and/or subsequent frames. The preceding and/or subsequent frames may be frames which have been obtained by decoding previously encoded frames.

Regarding FIG. 1, the construction of the trajectory T is explained with reference to three preceding frames Fi-1, Fi-2, and Fi-3. Additionally, further preceding frames and subsequent frames might also be taken into account as will be more apparent from the explanations as set out below.

Starting from the image pixel P in the current frame Fi, at least two pixels P1 and P1' are determined in the preceding frame Fi-1. The first motion-shifted version P1 may be calculated based on a linear motion model and a linear motion vector which describes the movement of the image pixel from the preceding frame Fi-1 to the current frame Fi.

The second motion-shifted version P1' may be calculated based on a higher order motion model which is supposed to provide a more accurate estimation of the pixel movement than the linear model applied to the first motion-shifted version P1. In order to provide a better estimation than the linear model, the higher order motion model preferably uses more estimation parameters than the linear model.

Then, the distance d1 between both motion shifted versions P1 and P1' is calculated and compared with a predefined threshold. Depending on the result of this comparison, the first motion-shifted version P1 or the second motion-shifted version P1' will be added to the trajectory T:

a) If the distance d1 between the pixel location of the first motion-shifted version P1 and the pixel location of the second motion-shifted version P1' is smaller than the predefined threshold, the first motion-shifted version P1 is added to the individual motion trajectory T.

b) If the distance d1 between the pixel location of the first motion-shifted version P1 and the pixel location of the second motion-shifted version P1' equals or exceeds the predefined threshold, the second motion-shifted version P1' is added to the individual motion trajectory T.

Hereafter, it is assumed that the distance d1 between the pixel location of the first motion-shifted version P1 and the pixel location of the second motion-shifted version P1' is smaller than the predefined threshold. Therefore, the first motion-shifted version P1 is added to the individual motion trajectory T, and the second motion-shifted version P1' is discarded.

In the same way, the other preceding frames Fi-2 and Fi-3 are analyzed, and motion-shifted versions of the image pixel P are added to the motion trajectory T:

Starting from the first motion-shifted version P1 in frame Fi-1, two pixels P2 and P2' are determined in the further preceding frame Fi-2. A first motion-shifted version P2 is calculated based on the linear motion model. A second motion-shifted version P2' is calculated based on the higher order motion model. Then, the distance d2 between both motion shifted versions P2 and P2' is calculated and compared to the predefined threshold. Depending on the result of this comparison, the first motion-shifted version P2 or the second motion-shifted version P2' will be added to the trajectory T. Here, it is assumed that the distance d2 between the pixel location of the first motion-shifted version P2 and the pixel location of the second motion-shifted version P2' exceeds the predefined threshold. Therefore, the second motion-shifted version P2' is added to the individual motion trajectory T, and the first motion-shifted version P2 is discarded.

Starting from the second motion-shifted version P2' in frame Fi-2, two motion-shifted versions P3 and P3' are determined in the further preceding frame Fi-3. The first motion-shifted version P3 is calculated based on the linear motion model, and the second motion-shifted version P3' is calculated based on the higher order motion model. Then, the distance d3 between both motion shifted versions P3 and P3' is calculated and compared to the predefined threshold. Depending on the result of this comparison, the first motion-shifted version P3 or the second motion-shifted version P3' will be added to the trajectory T as explained above.

The length of the trajectory may be predefined or flexibly adapted to further parameters such as parameters of the resulting trajectory. If for instance the pixel values (e.g. amplitude, color) of the motion shifted versions in previous or subsequent frames differ too much from the value of the image pixel P in the current frame Fi, the trajectory may be stopped.

After the trajectory T has been completed, the pixel values (e.g. pixel amplitudes) of the motion-shifted versions P1, P2', P3 of the image pixel P along the individual motion trajectory T may be processed using a weighting function, and a processed pixel value (e.g. pixel amplitude) V'(P) of the image pixel P may be obtained. Furthermore, the difference ΔV(P) between the processed pixel value V'(P) and the pixel value V(P) of the image pixel P may be determined.

For encoding and/or decoding the image pixel P of the current frame Fi, the processed pixel value V'(P) and/or the difference ΔV(P) between the processed pixel value V'(P) and the unprocessed pixel value V(P) may be taken into account and added to the video sequence or to the bit stream which describes the video sequence.

Figure 2:
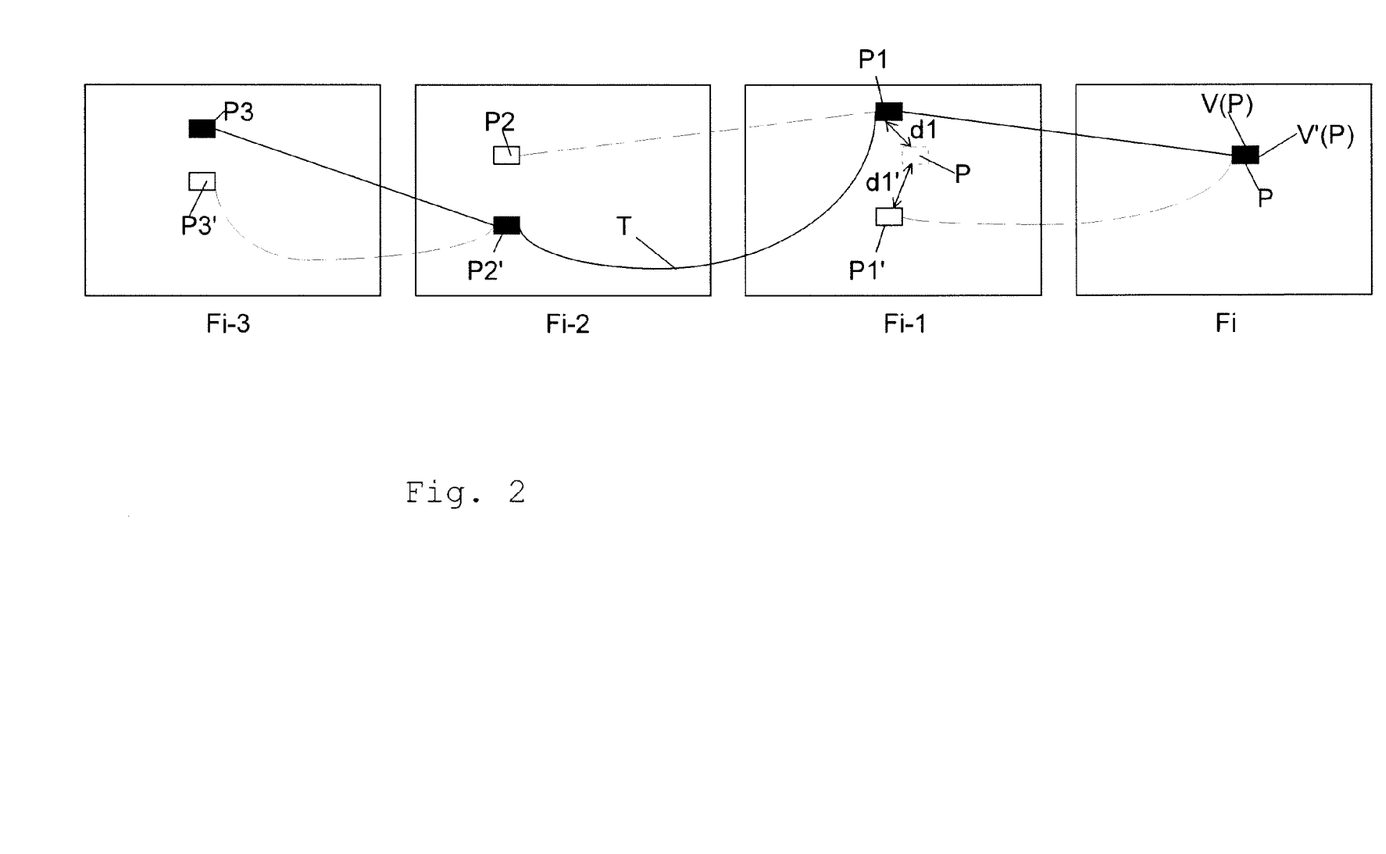

FIG. 2 shows a second exemplary embodiment of a method for processing the pixel value V(P) of an image pixel P contained in a current frame Fi of a video sequence.

In contrast to the first embodiment of FIG. 1, the distances between the position of both motion shifted versions P1 and P1' and the position of the image pixel P are calculated and compared to a predefined threshold. Depending on the result of the comparison, the first motion-shifted version or the second motion-shifted version will be added to the trajectory T:

Regarding frame Fi-1, the distance d1 between the pixel location of the first motion-shifted version P1 and the pixel location of the image pixel P in frame Fi is determined. Further, the distance d1' between the pixel location of the second motion-shifted version P1' and the pixel location of the image pixel P in frame Fi is determined. If the difference between the distances d1 and d1' is smaller than a predefined threshold TH, the first motion-shifted version P1 is added to the individual motion trajectory T; otherwise the second motion-shifted version P1' is added to the individual motion trajectory T:

$|d1-d1'|<TH \Rightarrow P1$ is added $|d1-d1'|<TH \Rightarrow P1'$ is added

In the same way, the other preceding frames Fi-2 and Fi-3 are analyzed, and motion-shifted versions P2' and P3 of the image pixel P are added to the motion trajectory T.

After the trajectory T has been completed, the pixel values (e.g. pixel amplitudes) of the motion-shifted versions P1, P2', P3 of the image pixel P along the individual motion trajectory T may be processed using a weighting function, and a processed pixel value (e.g. pixel amplitude) V'(P) of the image pixel P may be obtained. Furthermore, the difference ΔV(P) between the processed pixel value V'(P) and the pixel value V(P) of the image pixel P may be determined. For encoding and/or decoding the image pixel P of the current frame Fi, the processed pixel value V'(P) and/or the difference ΔV(P) between the processed pixel value V'(P) and the unprocessed pixel value V(P) may be taken into account and added to the video sequence or to the bit stream which describes the video sequence.

Figure 3:
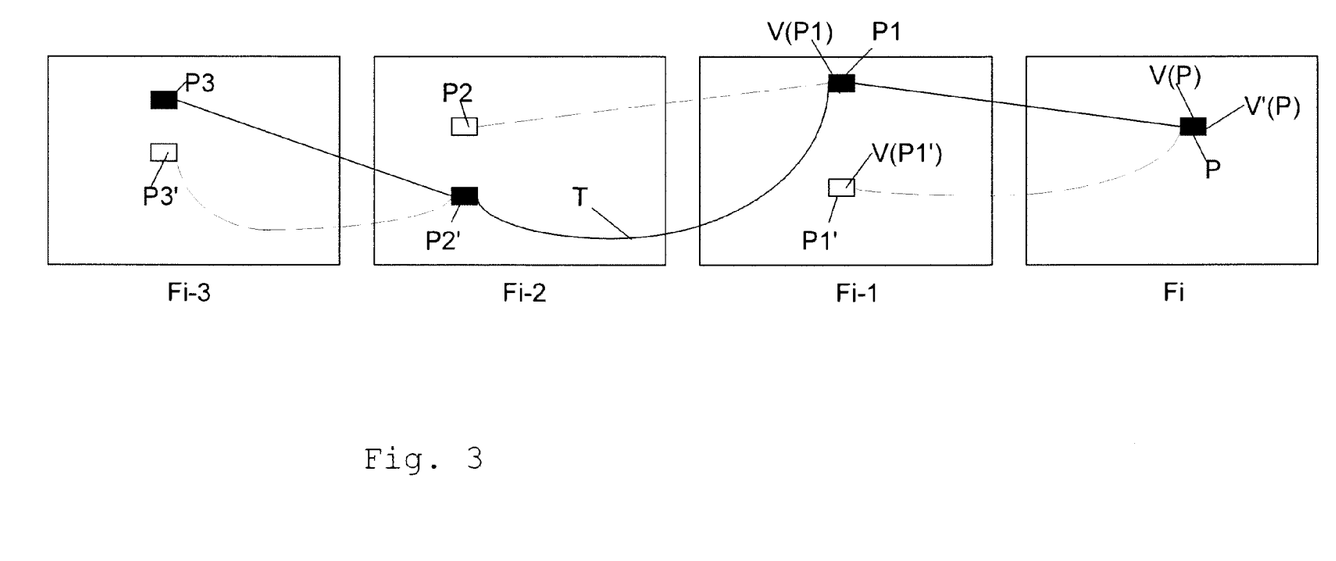

FIG. 3 shows a third exemplary embodiment of a method for processing the pixel value V(P) of an image pixel P contained in a current frame Fi of a video sequence.

In contrast to the first and second embodiments, the pixel values (e.g. pixel amplitudes, color values) between the motion shifted versions are calculated and the differences between the pixel values are compared to a predefined threshold. This will be explained in further detail below:

Starting from image pixel P in the current frame Fi, at least two pixels P1 and P1' are determined in the preceding frame Fi-1. Again, the first motion-shifted version P1 may be calculated based on a linear motion model, and the second motion-shifted version P1' may be calculated based on a higher order motion model.

Then, the pixel values V(P1) and V(P1') of the first and second motion-shifted versions P1 and P1' are compared, and a difference value ΔV1 is calculated:

$\Delta V1 = |V(P1) - V(P1')|$

If the difference value ΔV1 is smaller than a predefined threshold, the first motion-shifted version P1 is added to the individual motion trajectory T.

If the difference value ΔV1 equals or exceeds the predefined threshold, the second motion-shifted version P1' is added to the individual motion trajectory T.

Hereafter, it is assumed that the difference value ΔV1 is smaller than the predefined threshold. Therefore, the first motion-shifted version P1 is added to the individual motion trajectory T, and the second motion-shifted version P1' is discarded.

In the same way, the other preceding frames Fi-2 and Fi-3 are analyzed and motion-shifted versions P2' and P3 of the image pixel P are added to the motion trajectory T.

After the trajectory T has been completed, the pixel values (e.g. pixel amplitudes) of the motion-shifted versions P1, P2', and P3 of the image pixel P along the individual motion trajectory T may be processed using a weighting function as explained above.

Figure 4:
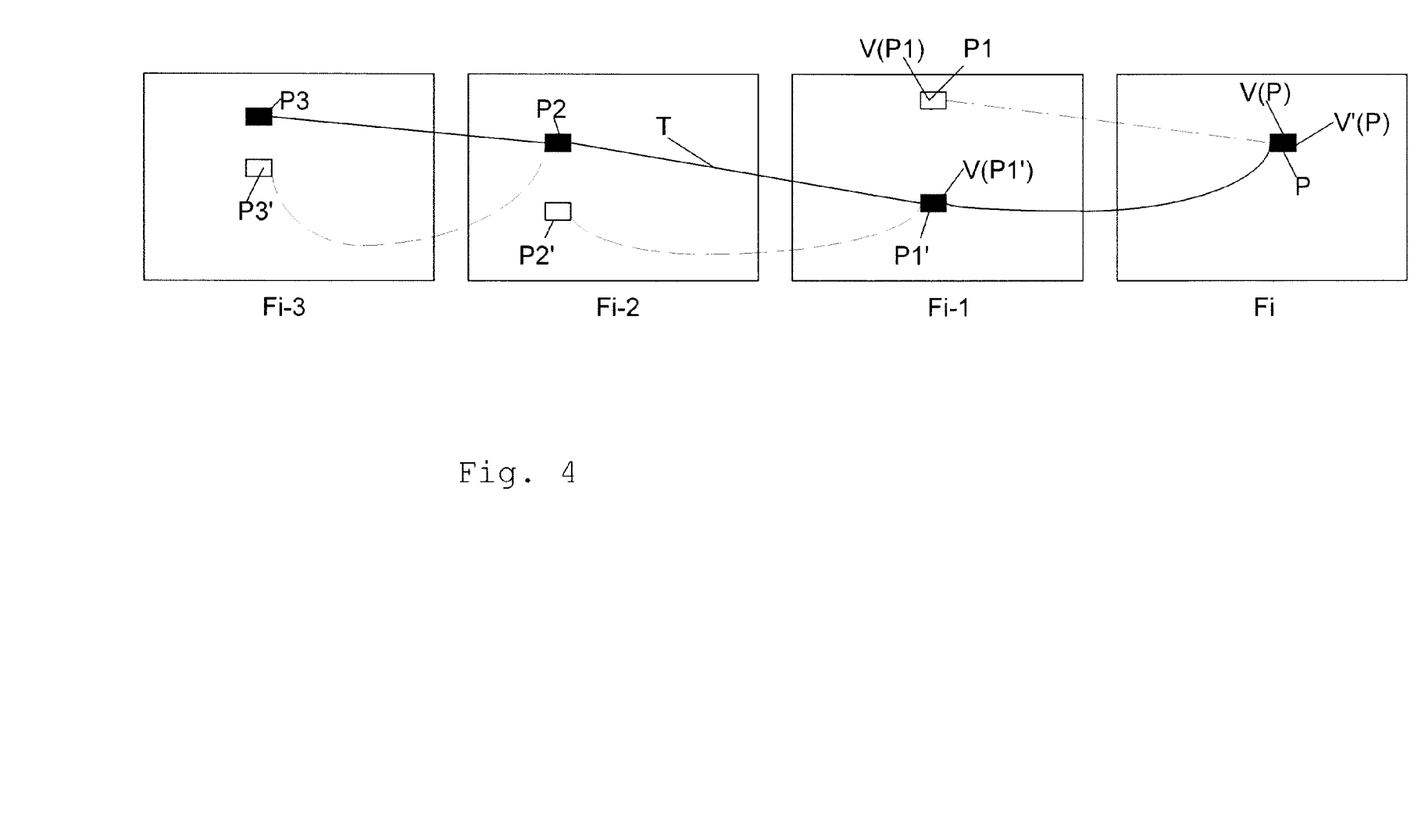

FIG. 4 shows a fourth exemplary embodiment of a method for processing the pixel value V(P) of an image pixel P contained in a current frame Fi of a video sequence.

In contrast to the third embodiment of FIG. 3, the pixel values (e.g. pixel amplitudes, color values) of the motion shifted versions are compared to the pixel value V(P) of the image pixel P in frame Fi.

Starting from image pixel P in the current frame Fi, at least two pixels P1 and P1' are determined in the preceding frame Fi-1. The first motion-shifted version P1 may be calculated based on a linear motion model, and the second motion-shifted version P1' may be calculated based on a higher order motion model.

Then, the pixel values V(P1) and V(P1') of the first and second motion-shifted versions P1 and P1' are compared to the pixel value V(P) of the image pixel P in frame Fi, and difference values ΔV1 and ΔV1' are calculated:

$$\Delta V1 = |V(P1) - V(P)|$$

$$\Delta V1' = |V(P1') - V(P)|$$

If the difference value ΔV1 is smaller than the difference value ΔV1', the first motion-shifted version P1 is added to the individual motion trajectory T.

If the difference value ΔV1 equals or exceeds the difference value ΔV1', the second motion-shifted version P1' is added to the individual motion trajectory T. The latter case is shown in FIG. 4.

In the same way, the other preceding frames Fi-2 and Fi-3 are analyzed, and motion-shifted versions P2 and P3 of the image pixel P are added to the motion trajectory T.

After the trajectory T has been completed, the pixel values (e.g. pixel amplitudes) of the motion-shifted versions P1', P2, and P3 of the image pixel P along the individual motion trajectory T may be processed using a weighting function as explained above.

Figure 5:
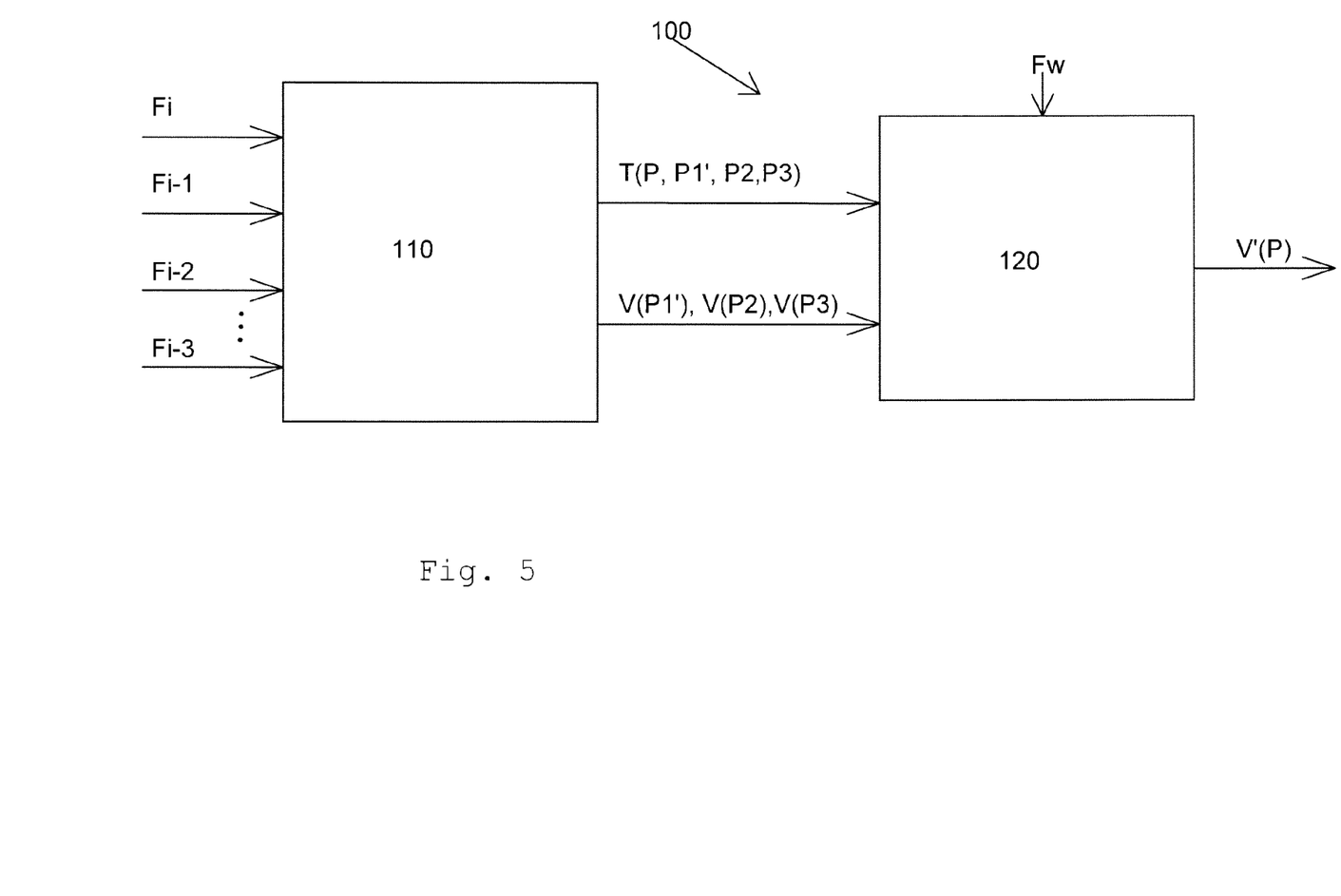
FIG. 5 shows an exemplary embodiment of a device capable of processing the pixel value of image pixels in frames of a video sequence.

FIG. 5 shows an embodiment of a device 100 for processing the pixel value V(P) of block image pixels P contained in a video sequence.

The device 100 comprises a trajectory constructing unit 110 which constructs an individual motion trajectory T(P, P1',P2,P3) comprising motion-shifted versions of block image pixel P1', P2, and P3 (see also FIG. 4) over a multiplicity of neighboring frames Fi to Fi-3 (see also FIG. 4).

The device 100 further comprises a combining unit 120 which combines the pixel values V(P1'), V(P2) and V(P3) of the motion-shifted versions P1', P2, and P3 of the block image pixel P along the individual motion trajectory T using a predefined weighting function Fw in order to form a processed pixel value V'(P) of the said block image pixel P.

The weighting function Fw may be a function which averages the pixel values V(P1'), V(P2) and V(P3) and generates a mean pixel value Vmean:

$$V\text{mean} = (V(P1') + V(P2) + V(P3) + \ldots V(Pn))/n$$

wherein n defines the number of frames taken into account.

REFERENCES

[1] P. List, A. Joch, J. Lainema, G. Bjøntegaard, and M. Karczewicz, "Adaptive deblocking filter," IEEE Transactions on Circuits and Systems for Video Technology (TCSVT), 2003.

[2] E. Dubois and S. Sabri, "Noise reduction in image sequences using motion-compensated temporal filtering," IEEE Transactions on Communications, vol. 32, no. 7, pp. 826-831, July 1984.

[3] J.-R. Ohm, "Three-dimensional subband coding with motion compensation," IEEE Transactions on Image Processing, September 1994.

[4] X. Wang, M. Karczewicz, J. Ridge, and Y. Bao, "Simplified update step of motion compensated temporal filtering for video coding," in Proceedings of the 24th Picture Coding Symposium, 2006, pp. 826-831.

[5] D. T. Vo and T. Q. Nguyen, "Optimal motion compensated spatio-temporal filter for quality enhancement of H.264/AVC compressed video sequences," in Proceedings of the 16th International Conference on Image Processing (ICIP), November 2009, pp. 3173-3176.

[6] A. Glantz, A. Krutz, M. Haller, and T. Sikora, "Video coding using global motion temporal filtering," in ICIP, November 2009, pp. 1053-1056.

REFERENCE SIGNS 100 device
110 trajectory constructing unit
120 combining unit
d1 distance
d1' distance
d2 distance
d3 distance
Fi frame
Fi-1 frame
Fi-2 frame
Fi-3 frame
Fw weighting function
P1, P1' pixels
P2, P2' pixels
P3, P3' pixels
V(P) pixel value
V'(P) processed pixel value
T motion trajectory

The invention claimed is:

1. A method for processing a pixel value of at least one image pixel contained in a current frame of a video sequence, said method comprising the steps of constructing an individual motion trajectory comprising motion-shifted versions of the at least one image pixel over a plurality of preceding and/or subsequent frames, and processing the pixel value based on the individual motion trajectory, wherein said step of constructing said individual motion trajectory comprises the steps of:
choosing the at least one image pixel of the current frame as a start pixel of the individual motion trajectory, and
adding motion-shifted versions of the at least one image pixel of preceding and/or subsequent frames to the individual motion trajectory;

wherein for each of the plurality of preceding and/or subsequent frames, at least two motion-shifted versions of the at least one image pixel are determined per frame, a first motion-shifted version of said at least two motion-shifted versions per frame being determined based on a first motion model and a second motion-shifted version of said at least two motion-shifted versions per frame being determined based on a second motion model, wherein the second motion model provides a more accurate estimation of pixel motion than the first motion model, wherein for each of the plurality of preceding and/or subsequent frames, the distance between said at least two motion-shifted versions in their respective same frame is determined, wherein, for each of the plurality of preceding and/or subsequent frames, one of said at least two motion-shifted versions of the at least one image pixel is selected per frame based on the distance or distances between the motion-shifted versions in their respective same frame, and wherein the selected motion-shifted version is added to the individual motion trajectory.

2. The method of claim 1, wherein for each of the plurality of preceding and/or subsequent frames, the first motion-shifted version is added to the individual motion trajectory if the distance between the pixel location of the first motion-shifted version and the pixel location of the second motion-shifted version is smaller than a predefined threshold, and wherein for each of the plurality of preceding and/or subsequent frames, the second motion-shifted version is added to the individual motion trajectory if the distance between the pixel location of the first motion-shifted version and the pixel location of the second motion-shifted version exceeds said predefined threshold.

3. The method of claim 1, wherein the second motion model requires more motion related parameters.

4. The method of claim 1, wherein for each of the plurality of preceding and/or subsequent frames, the first motion-shifted version is added to the individual motion trajectory if the difference between the pixel value of the first motion-shifted version and the pixel value of the second motion-shifted version is smaller than a predefined threshold, and wherein for each of the plurality preceding and/or subsequent frames, the second motion-shifted version is added to the individual motion trajectory if the difference between the pixel value of the first motion-shifted version and the pixel value of the second motion-shifted version exceeds said predefined threshold.

5. The method of claim 1, wherein said step of comparing said at least two motion-shifted versions with the at least one image pixel of the current frame includes determining the distances between said at least two motion-shifted versions and the at least one image pixel of the current frame, respectively, wherein for each of the plurality of preceding and/or subsequent frames, the first motion-shifted version is added to the individual motion trajectory if the difference in the distances is smaller than a predefined threshold, and wherein for each of the plurality of preceding and/or subsequent frames, the second motion-shifted version is added to the individual motion trajectory if the difference in the distances exceeds the predefined threshold.

6. The method of claim 1, wherein said step of comparing said at least two motion-shifted versions with the at least one image pixel of the current frame includes comparing the pixel values of said at least two motion-shifted versions with the pixel value of the at least one image pixel of the current frame, respectively, and choosing the motion-shifted version which has the most similar pixel value compared to the at least one image pixel of the current frame.

7. The method of claim 1 further comprising the step of adding an individual stop marker for the processed pixel value to the video data bit stream, said individual stop marker describing the individual length of the individual motion trajectory that was used for forming said processed pixel value.

8. The method according to claim 1, wherein the individual motion trajectory of said image pixel is constructed by concatenating at least two block motion vectors between adjacent frames of the video sequence, said at least two block motion vectors describing the motion of image blocks, each of which comprises said image pixel.

9. The method according to claim 8, wherein said at least two block motion vectors between adjacent frames of the video sequence are coded in the video bit stream.

10. The method according to claim 1, wherein frames of said video sequence are filtered and/or predicted by incorporating said processed pixel value of said image pixel into the video sequence.

11. The method of claim 1, wherein at least one flag bit is generated to signal the presence of the processed pixel values in the video sequence.

12. The method according to claim 1 wherein the processed pixel value of said block image pixel is formed by recursive accumulation of the pixel values of the selected motion-shifted versions of said image pixel along the individual motion trajectory.

13. A device for processing pixel values of at least one block image pixel contained in a video sequence, said device comprising:

trajectory constructing means configured to construct an individual motion trajectory comprising motion-shifted versions of said block image pixel over a multiplicity of neighboring frames; and combining means configured to combine the pixel values of the motion-shifted versions of said block image pixel along the individual motion trajectory using a weighting function, to form a processed pixel value of said block image pixel, wherein for each of the multiplicity of neighboring frames, the trajectory constructing means is configured to determine at least two motion-shifted versions of said block image pixel per frame, a first motion-shifted version of said at least two motion-shifted versions per frame to be determined based on a first motion model and a second motion-shifted version of said at least two motion-shifted versions per frame to be determined based on a second motion model, wherein the second motion model provides a more accurate estimation of pixel motion than the first motion model, wherein the trajectory constructing means is configured to select one of said at least two motion-shifted versions of said block image pixel per frame, wherein to select one of said at least two motion-shifted versions of said block image pixel, said trajectory constructing means is configured to compare said at least two motion-shifted versions with each other or with said block image pixel of a current frame, and to choose one of said at least two motion-shifted versions based on a comparison result, and wherein to compare said at least two motion-shifted versions with each other, said trajectory constructing means is configured to determine a distance between said at least two motion-shifted versions, and to choose one of said at least two motion-shifted versions per frame based on said distance or distances between the motion-shifted versions in their respective same frame.

14. The device of claim 13 further comprising a marker adder capable of adding at least one stop marker for at least one of the processed image pixels, said individual stop marker describing the individual length of the individual motion trajectory of said processed image pixel, and/or a flag bit generator adapted to generate at least one flag bit to signal the presence of the processed pixel values in the video sequence.

15. The device according to claim 13, wherein the device is an encoder for processing an incoming video sequence and generating an encoded video data bit stream;

wherein the encoder comprises a data bit generator capable of generating said encoded video data bit stream that describes said video sequence; and wherein the encoder is configured to include said processed pixel values generated by said combining means into the encoded video data bit stream.

16. The device according to claim 13, wherein the device is a decoder for decoding an encoded video data bit stream to generate a decoded video sequence;

wherein the decoder comprises means for decoding data bits that describe said video sequence; and wherein the decoder is configured to include said processed pixel values generated by said combining means into the decoded video sequence.

* * * * *